United States Patent [19]

Cavanaugh

[11] Patent Number: 4,529,781
[45] Date of Patent: Jul. 16, 1985

[54] PROCESS FOR THE SUSPENSION POLYMERIZATION OF TETRAFLUOROETHYLENE

[75] Inventor: Robert J. Cavanaugh, Vienna, W. Va.

[73] Assignee: E. I. Du Pont de Nemours and Company, Wilmington, Del.

[21] Appl. No.: 579,568

[22] Filed: Feb. 13, 1984

[51] Int. Cl.$^3$ .............................................. C08F 14/26
[52] U.S. Cl. ..................................... 526/214; 526/255
[58] Field of Search ................ 526/213, 214, 215, 255

[56] References Cited

U.S. PATENT DOCUMENTS

| | | | |
|---|---|---|---|
| 2,559,752 | 7/1951 | Berry | 260/29.6 |
| 2,965,595 | 12/1960 | Brinker et al. | 526/213 |
| 3,245,972 | 4/1966 | Anderson | 260/92.1 |
| 4,298,699 | 11/1981 | Asawa et al. | 521/31 |
| 4,363,900 | 12/1982 | Shimizu et al. | 526/255 |

*Primary Examiner*—Harry Wong, Jr.

[57] ABSTRACT

In the suspension polymerization of tetrafluoroethylene to make granular polymers, presence of a selected salt of a perfluorinated nonanoate enhances desirable properties of the product and the process.

4 Claims, No Drawings

PROCESS FOR THE SUSPENSION POLYMERIZATION OF TETRAFLUOROETHYLENE

FIELD

This invention relates to an improvement in the suspension polymerization of tetrafluoroethylene to make granular polymer.

BACKGROUND the homopolymerization of tetrafluoroethylene and the copolymerization of tetrafluoroethylene with very small amounts of ethylenically unsaturated comonomers in aqueous medium can be carried out by two distinctly different procedures. In one procedure, called suspension polymerization, little or no dispersing agent is employed and agitation is carried out vigorously in order to produce a precipitated resin, commonly referred to as "granular" resin. In the other procedure, sufficient dispersing agent is employed and agitation is mild in order to produce small colloidal size particles dispersed in the aqueous reaction medium. In this second procedure, called aqueous dispersion polymerization, precipitation (i.e., coagulation) of the resin particles is avoided. The two procedures produce distinctly different products. The granular product can be molded in various forms, whereas the resin produced by the aqueous dispersion method cannot be molded but is fabricated by dispersion coating or by converting to powder for paste extrusion with a lubricating medium. In contrast, the granular resin is incapable of being paste extruded or dispersion coated.

However, even in the suspension polymerization procedure, presence of small amounts of dispersing agent are sometimes beneficial to increase the surface area of the granular polymer particles produced. See, for example, Anderson, U.S. Pat. No. 3,245,972, when in Example VI, use of 300 ppm ammonium perfluorooctanoate, $CF_3\text{-}(CF_2)_6COONH_4$, is taught. Use of other dispersing agents with additional beneficial properties has long been a research goal.

SUMMARY

In this invention, a new dispersing agent for use in the suspension polymerization of tetrafluoroethylene to make granular polymer is employed which surprisingly provides increased surface area in the particles made and provides low yield loss and improves polymerization rates. The dispersing agent is a perfluorinated nonanoate of the formula

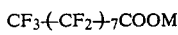

$$CF_3\text{-}(CF_2)_7COOM$$

where M is hydrogen, ammonium or an alkali metal. Mixtures of such nonanoates may be employed if desired.

DESCRIPTION OF THE INVENTION

The polymerization of tetrafluoroethylene, alone or with other polymerizable ethylenically unsaturated comonomers, in aqueous medium to produce granular tetrafluoroethylene polymer is well known in the art. Tetrafluoroethylene monomer, along with ethylenically unsaturated comonomer if desired, is typically admixed or contacted with an aqueous medium containing a polymerization initiator. Ordinarily, the aqueous monomer (or monomers) is introduced into the medium under pressure. Typical conditions include polymerization temperatures of 50°–100° C.; preferably 60°–90° C.; and pressures of 10–50×10⁵ Pa. The polymerization is ordinarily carried out in a vigorously stirred autoclave.

Initiators employed herein are ionic initiators. Examples of ionic polymerization initiators include inorganic persulfates such as ammonium persulfate or alkali metal persulfates such as potassium persulfate and the like. The initiator is added prior to initiation of polymerization. The amount of initiator employed depends on the temperature of polymerization, the nature of the initiator, the molecular weight of the polymer desired, and the rate of reaction desired. Thus, the amount will vary depending on the results desired by one skilled in the art. Ordinarily, the amount will be between 2 and 500 ppm, based on weight of water present.

A dispersing agent can be employed, if desired, which is an anionic, substantially non-telogenic dispersing agent. The amount of dispersing agent present, when used, is ordinarily between about 2 ppm and about 200 ppm based on weight of water employed in the aqueous dispersion and is insufficient to cause formation of colloidal polymer particles. The dispersing agent is usually added prior to initiation of polymerization. If desired, a small amount of a nonionic dispersing agent may be employed along with the anionic one.

Tetrafluoroethylene is either employed alone (to produce the homopolymer, polytetrafluoroethylene) or is employed with other copolymerizable, ethylenically unsaturated organic comonomer. The amount of comonomer employed will depend upon the properties desired in the polymer particles obtained, but will not be so great as to result in tetrafluoroethylene copolymers that are melt-processible. In other words, the polymers obtained are non-melt-processible polymers. Especially preferred comonomers, are perfluoro(terminally unsaturated olefins) of 3–7 carbon atoms such as hexafluoropropylene, and perfluoro(alkyl vinyl ethers) of 3–7 carbon atoms such as perfluoro(n-propyl vinyl ether). As used herein in both this description and the claims, the term "polytetrafluoroethylene means" both homopolymer and copolymers as described herein.

By the term "non-melt-fabricable", is meant that the polymers have an apparent melt viscosity of at least $1 \times 10^9$ poises at 380° C. Melt viscosity is determined by measuring the tensile creep of a sintered piece held at 380° C. Specifically, 12 g. of molding powder is placed in a 7.6 cm. diameter mold between 0.152 cm. rubber cauls and paper spacers. Pressure is then slowly applied on the mold until a value of 140.6 kg./cm.² is obtained. This pressure is held for 2 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with sliver-coated copper wire. The distance between wrappings is 4.0 cm. This quartz rod-sample assembly is placed in a columnar oven where the 4 cm. test length is brought to a temperature of 380°±2° C. A weight is then attached to the bottom quartz rod to give a total weight suspended from the sample sliver of about 4 g.

The elongation measurements vs. time are obtained, and the best average slope for the creep curve in the interval between 30 and 60 minutes is measured. The specific melt viscosity, which may be better called apparent melt viscosity, is then calculated from the relationship.

$$\eta app = (WL_tg)/3(dL_t/dt)A_T$$

where $\eta app$ = (apparent) melt viscosity
W = tensile load on sample, g
$L_t$ = length of sample (at 380° C.) cms. (4.32 cm)
g = gravitational constant, 980 cm./sec.$^2$
($dL_t/dt$) = rate of elongation of sample under load = -slope of elongation vs. time plot, cm./sec.
$A_T$ = cross-sectional area of sample (at 380° C.), cm$^2$ (area increases 37% at 380° C. over that at room temperature).

Polymerization is ordinarily conducted until the solids level (i.e., polymer content) of the aqueous mixture is between about 15 and 40 percent by weight of the mixture.

The perfluorinated nonanoate salt used as dispersing agent herein will be present in amounts of between 2 ppm and 200 ppm based on weight of water used and will be insufficient to cause formation of colloidal particles under the suspension polymerization conditions employed.

The resin produced herein is of the same quality and is useful in the same manner as granular tetrafluoroethylene polymers known heretofore. For example, the polymers are useful in making molded articles.

The Examples hereinbelow describe the invention in greater detail. Because suspension polymerization of tetrafluoroethylene are difficult to reproduce exactly due to sensitivity to monomer purity or polymerizer cleanliness, polymerization runs carried out on different days are not generally comparable. In the following Examples, the designated comparisons were carried out on the same day as the Example compared with.

EXAMPLES

An autoclave equipped with a two blade agitator was charged with demineralized water, "Triton" X-100 solution and the fluorosurfactant in the quantities indicated in Table I. In Example 1 and Comparisons A–D, the fluorosurfactant was added as a solution in water. The surfactants used in B and D were neutralized with ammonium hydroxide.

The autoclave was heated to the indicated temperature and evacuated and purged three times to remove residual air.

The autoclave was agitated at 600 RPM and a solution of ammonium persulfate initiator was added. Tetrafluoroethylene was added until the pressure reached 250 psi (1.72M Pa). After the reaction had begun, as evidenced by a pressure drop, additional tetrafluoroethylene was added to maintain 250 psi (1.72M Pa). After the desired amount of tetrafluoroethylene was added, the feed was stopped and the monomer allowed to react down until a vacuum was obtained. After cooling, the contents of the autoclave were discharged and the solids separated from the mother liquor. Any large adhesions which formed were removed from the bulk of the polymer. The surface area of the dried polymer was determined using the BET method ("Quantasorb"). This method is as follows:

The sample is cooled and nitrogen is absorbed into the polymer. The sample is then warmed to desorb the nitrogen which quantity is then measured using a thermal conductivity detector.

The fluorosurfactants used are described as follows:

FC-143—A mixture of ammonium perfluorocaprylate isomers. The predominate isomer is the linear eight carbon chain.
n-perfluorocaprylic acid
n-perfluorodecanoic acid
ammonium omega hydro perfluorononanoate ammonium perfluorononanoate

TABLE I

| | Example 1 and Comparisons A to D | | | | |
|---|---|---|---|---|---|
| | A | B | 1 | C | D |
| Water, Parts | 227,000 | 227,000 | 227,000 | 227,000 | 227,000 |
| "Triton" Solution (0.226 g/l), parts | 100 | 100 | 100 | 100 | 100 |
| Ammonium Persulfate (parts) | 1 | 1 | 1 | 1 | 1 |
| Fluorosurfactant Type | FC-143 | Perfluoro caprylic Acid | Ammonium Perfluoro-nanoate | Omega Hydro Perfluoro-caprylate | Perfluoro Decanoic Acid |
| Parts | 2.0 | 1.9 | 2.2 | 1.9 | 2.4 |
| Moles/Liter | $2.04 \times 10^{-5}$ | $2.04 \times 10^{-5}$ | $2.04 \times 10^{-5}$ | $1.83 \times 10^{-5}$ | $2.04 \times 10^{-5}$ |
| Tetrafluoroethylene Parts | 81,720 | 81,720 | 81,720 | 81,720 | 81,720 |
| Polymerization Temperature | 62° C. | 62° C. | 62° C. | 62° C. | 62° C. |
| Reaction Time, Minutes | 50 | 63 | 58 | 80 | 82 |
| Adhesions, Parts | 6810 | 59,000 | 18,600 | 77,180 | 9080 |
| % Solids in Mother Liquor | 1.30 | 1.41 | 1.14 | 1.91 | 4.90 |
| Surface Area, m$^2$/g | 3.99 | 5.02 | 6.04 | 4.18 | 4.55 |

The results of these experiments show that:

i. The dispersing agent of this invention results in the highest surface area polymer produced (6.04 m$^2$/g).

ii. The dispersing agent of this invention has the lowest percent solids in the mother liquor. Thus it has the lowest yield loss. This is particularly valuable in view of the high surface area. Normally to achieve high surface area, high dispersing agent concentrations must be used. This results in high yield loss to mother liquor.

iii. A significant difference in reaction time, adhesion level, surface area and mother liquor solids exists between Example 1 and Comparison C, which differ by only one fluorine atom.

EXAMPLE 2—GENERAL PROCEDURE

An autoclave was charged with 69,700 parts demineralized water, one part ammonium persulfate, 2.5 parts citric acid (to reduce adhesions), 1.6 parts of a 0.74% solution of "Triton" X-100 and the indicated fluorosurfactant. The autoclave was evacuated to remove air and tetrafluoroethylene added to increase the pressure to 250 psi (1.72M Pa). The temperature was 65° C. After the reaction began, as evidenced by a drop in pressure, additional tetrafluoroethylene was added to maintain the pressure at 250 psi (1.72M Pa). After a total of 32,700 parts of tetrafluoroethylene was added, the feed was shut off and the autoclave allowed to react down to a vaccum. After cooling, the contents were discharged. Surface area was determined using a "Quantasorb", as described in Example 1.

TABLE II

| Example 2A and 2B and Comparisons E and F | Fluorosurfactant | | Reaction Time (Minutes) | Surface Area ($m^2gm$) |
|---|---|---|---|---|
| | Type | Parts | | |
| E | FC-143 | 2.7 | 57.0 | 3.72 |
| F | FC-143 | 2.4 | 54.5 | 3.51 |
| 2A | Ammonium Perfluorononanoate | 2.0 | 49.4 | 3.90 |
| 2B | Ammonium Perfluorononanoate | 1.7 | 44.6 | 3.68 |

Example 2 illustrates the use of reduced levels of the perfluorononanoate in 2A and 2B to achieve a given surface area with a significantly reduced reaction time over comparisons E and F.

I claim:

1. In the suspension polymerization of tetrafluoroethylene in an aqueous medium to obtain polytetrafluoroethylene as a precipitate during the polymerization in the presence of an ionic initiator and a small amount of a dispersing agent, which comprises carrying out said polymerization at a temperature of between about 50° C. and 100° C. and at a pressure of between about $10 \times 10^5$ and $50 \times 10^5$ Pa, the improvement which comprises employing as the dispersing agent a perfluorinated nonanoate of the formula $$CF_3-(CF_2)_7COOM$$

wherein M is hydrogen, ammonium or an alkali metal, said dispersing agent being present in an amount between 2 and 200 ppm based on weight of water present.

2. The process of claim 1 wherein in the perfluorinated nonanoate, M is ammonium.

3. The process of claim 1 wherein the aqueous medium contains only tetrafluoroethylene as polymerization monomer.

4. The process of claim 1 wherein the aqueous medium contains tetrafluoroethylene and one or more other copolymerizable ethylenically unsaturated organic comonomers present in amounts that cause the resulting polymer to retain the non-melt-fabricable nature of polytetrafluoroethylene.

* * * * *